March 15, 1960
A. C. SAMPIETRO
2,928,261
AIR CONDITIONING SYSTEM
Filed Jan. 15, 1957
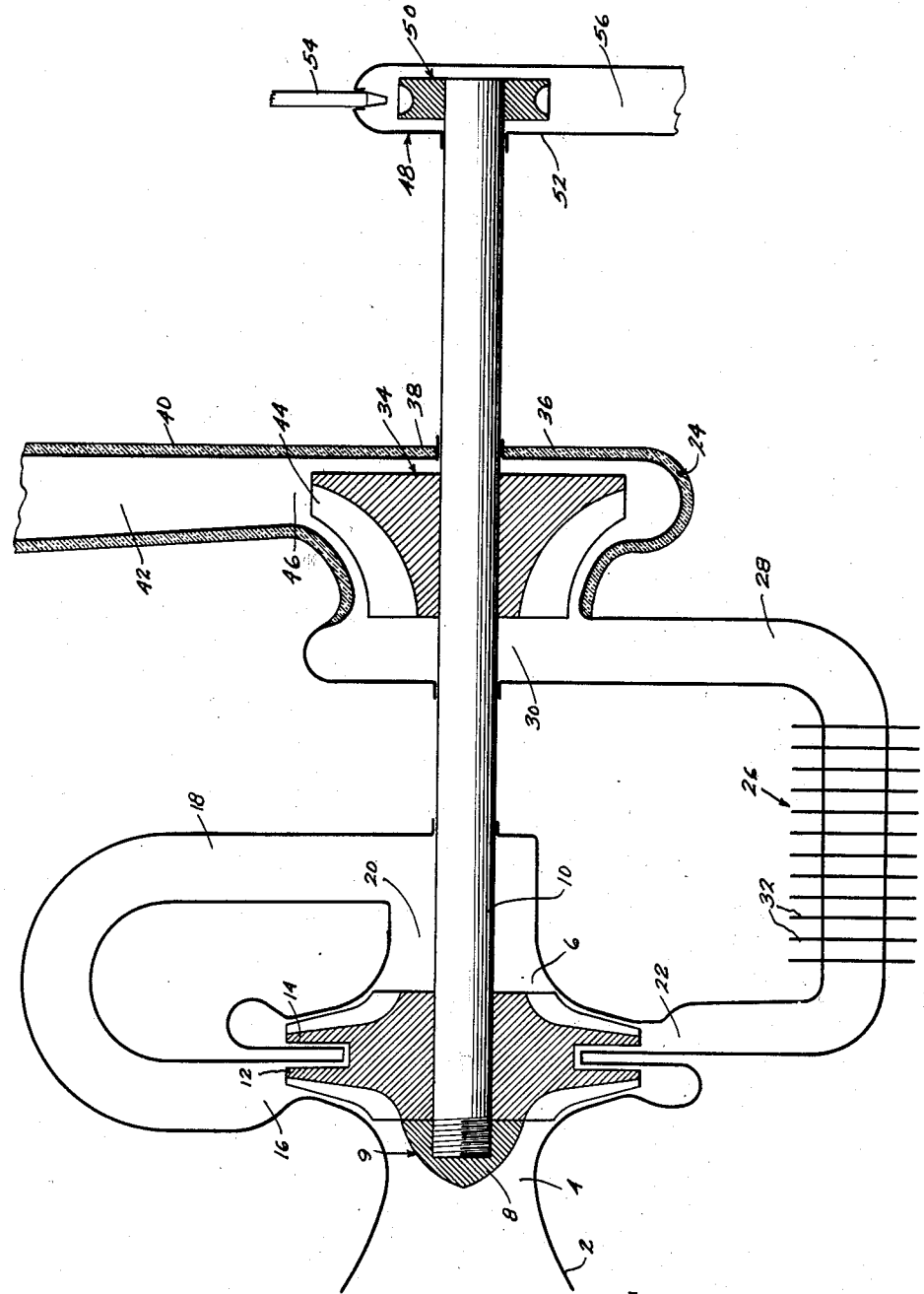
Inventor
ACHILLES C. SAMPIETRO
by
Attys.

United States Patent Office 2,928,261
Patented Mar. 15, 1960

2,928,261

AIR CONDITIONING SYSTEM

Achilles C. Sampietro, Detroit, Mich., assignor to Thompson Ramo Wooldridge Inc., a corporation of Ohio Application January 15, 1957, Serial No. 634,261

1 Claim. (Cl. 62—402)

The present invention relates to an improved mechanism for cooling a compartment such as the passenger or cargo space of a vehicle and to an improved method of utilizing and treating air or gas to be used for air conditioning.

In cooling a space or a compartment in an ambulant vehicle such as an automobile, the conservation of space and power for operating the conditioning mechanism is desirable. The present invention achieves an improved mechanism and method of conditioning by utilizing a single or multple stage air or gas compressor for pressurizing air or gas taken from the surrounding atmosphere or from a closed system. The compressed air or gas is directed through an intercooler wherein it is reduced in temperature to substantially the temperature of the ambient air. From the intercooler the air is treated by an adiabatic expansion using an air turbine for the expansion step. The air turbine is coaxially mounted on the drive shaft of the compressor and the energy taken from the expanding air is utilized to drive the compressor. The difference between the power required by the compressor and what can be recooperated from the air turbine is furnished by an additional prime mover such as an oil turbine driven by a system which usually can be found in the vehicle in which the conditioner is used. The conditioned air discharged from the air turbine is utilized to cool the compartment or space to be cooled.

An object of the invention is to provide an improved air conditioning system or a system and mechanism for the treatment of air to be used for conditioning or cooling a compartment such as in a vehicle or the like.

Another object of the invention is to provide an improved mechanism for cooling air to be discharged in a cooled compartment wherein the air is compressed and permitted to expand through an air turbine to obtain useful energy from the air during its expansion stage.

Another object of the invention is to provide an air cooling mechanism which requires a reduced operating power and which is well suited to being used in an automotive vehicle which provides a source of oil pressure to drive an oil turbine.

A further object of the invention is to provide a new use for an air turbine wherein it is combined in a compression expansion cooling cycle for cooling air to be used in reducing the temperature of a closed compartment.

A general object of the invention is to provide improved method and mechanism for cooling air wherein an air turbine is used in the expansion-cooling step of treating the air and wherein the air turbine is utilized in providing auxiliary power to drive the compressor which compresses the air.

Other objects and advantages will become more apparent with the teaching of the features and principles of the invention in connection with the disclosure of the preferred embodiment thereof in the specification, claim, and drawing, in which the single figure of the drawing is a vertical sectional view partially in schematic form showing a mechanism embodying the structure and utilizing the methods of the invention.

The air conditioning mechanism illustrated in the drawing, which functions to process air or gas and reduce its temperature, is well suited to use with an ambulant vehicle in that it consumes a minimum of space and its power requirements are low. Further, the mechanism is shown in its preferred embodiment, as receiving a portion of its operating power from an oil operated turbine, and a source of operating oil pressure is frequently available in automobiles wherein oil pressure is utilized to drive other operating mechanisms, such as power steering devices and the like.

The mechanism may be used in an open system wherein outside ambient air is cooled and discharged into the compartment or space to be cooled, or the mechanism may be utilized in a closed system where a gas or air is recycled and recooled after being used for cooling the compartment. It will further be understood that the cooled air, when supplied by the mechanism illustrated, may be used to directly cool the space or compartment or may be arranged for indirect cooling with a heat transferal apparatus.

While the utilizations above described and the particular embodiment and structure referred to are discussed as indicating the primary uses and environments in which the mechanism and method of the invention may be employed, the features and advantages of the invention may be used in other surroundings taking advantage of the utility afforded by the various aspects of the invention.

As may be viewed in the drawing, the air to be cooled is first drawn in through an air inlet duct 2, which leads to the intake 4 of a compressor 6. The compressor is shown as preferably being of the rotary type and being multi stage. The compressor rotor includes a hub 8 mounted on the compressor drive shaft 10. The hub carries circumferentially arranged rotor blades 12 for the first compressor stage and blades 14 for the second compressor stage. The compressor may be of various stages and is of the type of known construction. After the air is compressed in the first stage of the compressor it is passed out through the discharge duct 16 of the first stage and flows through a communicating passageway 18 at an intermediate pressure to enter the intake eye 20 of the second stage of the compressor. The air or gas being compressed is then discharged through the discharge conduit 22 of the second stage at its operating pressure.

The pressurized air, supplied from the compressor 6, is expanded by an adiabatic expansion in the air turbine 24.

Positioned intermediate of the compressor and air turbine is an intercooler 26. The intercooler forms part of a conduit 28 leading between the discharge 22 of the compressor and the intake 30 of the air turbine. The intercooler may be of various desired designs and is schematically shown as having a plurality of radially extending fins 30 for promoting the circulation of ambient air to cool the air or gas passing through the conduit 28. The intercooler thus reduces the air to a temperature approaching the ambient air.

The air turbine includes a rotor 34 carried within a housing 36. The rotor is driven in rotation by the air passing therethrough and is mounted on the drive shaft 10 for the compressor to aid in driving the compressor rotor.

To avoid loss in energy and insure an adiabatic expansion of the air or gas as it passes through the air turbine 24, a coating of insulation 38 may surround the casing or housing 36 of the air turbine and this insulation may be extended at 40 to surround the discharge duct 42, which carries the cool air as it leaves the air turbine.

The air turbine rotor 34 carries a plurality of blades 44, which provide passageways for the expanding air and which cooperate with the turbine housing 36 in the usual manner to insure efficient rotation of the turbine rotor 34 to obtain the maximum power from the expanding air.

In using the air turbine to process the air in this step in the method of cooling, the air is adiabatically expanded without a loss of heat and emerges from the discharge opening 46 of the air turbine in a cooled state. The air is then carried through the cool air duct 42 to be utilized to cool the compartment or space which is to be conditioned.

Although the power or energy of the expanding air in the air turbine is utilized to drive the compressor, the additional power required for the compressor is furnished by an auxiliary prime mover shown in the form of an oil turbine 48. The oil turbine has the rotor 50 mounted in a casing 52 and operating oil is received through the inlet line 54 and discharged through the line 56. The pressurized oil for operating the turbine 48 may be obtained from any suitable source and when the mechanism is used in an automotive vehicle, the pump used to generate oil pressure for the power steering will usually provide sufficient oil to provide for the requirements of the oil turbine 48. It will be seen that each of the rotors of the compressor 6, the air turbine 24, and the oil turbine 48, namely rotors 9, 34 and 50 are mounted coaxially on the same drive shaft 10. This permits an efficient transferral of power and enables effecting a compact condensed mechanism requiring little space. This is especially advantageous wherein the unit would be employed as an appendage to an automobile.

In operation, air or an operating gas enters through the intake 4 of the compressor 6. The rotor 9 compresses the air or gas by operation of the blades 12 of the first stage of the compressor and the subsequent operation of the blades of the second stage of the compressor. The air is then passed through an intercooler 26, wherein the temperature is reduced to approach the temperature of the ambient air. The compressed and cooled air is then expanded by the use of an air turbine 24. The energy of the expanding air is utilized to rotate the rotor 34 of the air turbine and aid in driving the compressor rotor 9. The difference between the power required by the compressor rotor and what can be recovered from the air turbine is furnished by the oil turbine 48, which is driven by a pressurized oil system. The cooled air, which has been adiabatically expanded through the air turbine is carried by the uct 42 to be utilized in cooling a compartment or space to be conditioned and reduced in temperature.

Thus, it will be seen that I have provided an improved method and mechanism providing the advantages and objects hereinbefore set forth. The system is effective and efficient in operation in that an air turbine is used to adiabatically expand the air and cool it to a substantially reduced temperature and the energy of the expanding air is utilized by the air turbine to aid in driving the compressor.

The system is continuous in operation with the deficiency of power supplied by a compact oil turbine. The entire unit may be compactly mounted and the three moving rotors are mounted on a single power shaft for an efficiency of power transmission and for minimum of vibration and space consumption.

I have, in the drawing and specification presented a detailed disclosure of the preferred embodiments, of my invention, but it is to be understood that I do not intend to limit the invention to the specific form disclosed, but intend to cover all modifications, changes and alternative constructions and methods falling within the scope of the principles taught by my invention.

I claim as my invention:

An air conditioning system for cooling a motor vehicle comprising an air intake duct, a rotary air compressor connected to the intake duct and includnig a rotor and a housing, an elongated drive shaft supporting the rotor, an intercooler having a cooling chamber and cooling vanes and connected to receive air from the compressor, an air turbine spaced axially a substantial distance from the compressor and out of heat transfer relationship therewith having a housing separated from the compressor housing and a rotor on said drive shaft, said turbine housing connected to the intercooler chamber to drive said turbine rotor by a flow of pressurized cool air from the intercooler chamber, said turbine shaped to obtain adiabatic expansion of the air passing therethrough, heat insulating means insulating the turbine so that an adiabatic expansion will occur to provide cool air to be utilized for cooling a compartment of a vehicle, a conditioned air duct connected to the air turbine housing to distribute air into the vehicle, heat insulating means housing said conditioned air duct for substantially reducing the transfer of heat energy to air in the duct, an oil turbine having a rotor to be driven by a pressurized oil flow and provide an auxiliary driving torque to the drive shaft for aiding in driving the compressor, said oil turbine rotor mounted on said shaft at a location spaced axially a substantial distance from and out of heat energy transfer relationship with said intercooler, with said compressor, and with said air turbine so that adiabatic expansion of the air in the air turbine will not be affected, and oil conduit means connected to the oil turbine for supplying oil under pressure to drive the oil turbine rotor.

References Cited in the file of this patent

UNITED STATES PATENTS

| 2,046,314 | Benkly | July 7, 1936 |
| 2,104,696 | Hanson | Jan. 4, 1938 |
| 2,577,176 | Anderson | Dec. 4, 1951 |
| 2,729,073 | Nielsen | Jan. 3, 1956 |
| 2,754,660 | Morrison | July 17, 1956 |
| 2,800,002 | Seed | July 23, 1957 |
| 2,804,021 | Swearingen | Aug. 27, 1957 |

FOREIGN PATENTS

| 70,671 | Switzerland | June 24, 1915 |